(12) United States Patent
Viaud

(10) Patent No.: US 6,994,020 B2
(45) Date of Patent: Feb. 7, 2006

(54) LARGE ROUND BALER

(75) Inventor: Jean Viaud, Gray (FR)

(73) Assignee: Deere & Company, Moline, IL (US)

( * ) Notice: Subject to any disclaimer, the term of this patent is extended or adjusted under 35 U.S.C. 154(b) by 25 days.

(21) Appl. No.: 10/440,469

(22) Filed: May 15, 2003

(65) Prior Publication Data

US 2004/0031402 A1 Feb. 19, 2004

(30) Foreign Application Priority Data

Jun. 1, 2002 (DE) .......................... 102 24 394

(51) Int. Cl.
*B30B 9/30* (2006.01)
*B30B 5/04* (2006.01)

(52) U.S. Cl. .............................. 100/87; 100/88; 100/89; 56/341

(58) Field of Classification Search ............. 100/87–89; 56/341, 344, 361
See application file for complete search history.

(56) References Cited

U.S. PATENT DOCUMENTS

| | | | | |
|---|---|---|---|---|
| 3,974,632 A | | 8/1976 | Van der Lely | ................ 56/341 |
| 4,088,069 A | * | 5/1978 | Soteropulos | ................. 100/88 |
| 4,172,354 A | * | 10/1979 | Vermeer et al. | .............. 56/341 |
| 4,683,815 A | * | 8/1987 | Van Ryswyk | ................ 100/88 |
| 4,730,446 A | * | 3/1988 | van der Lely | ................ 56/341 |
| 6,332,309 B1 | | 12/2001 | Rodewald | .................... 56/341 |
| 6,672,205 B2 | * | 1/2004 | Viaud | ........................ 100/87 |

FOREIGN PATENT DOCUMENTS

| | | |
|---|---|---|
| DE | 4315374 | 5/1993 |
| EP | 0 258 528 | 3/1988 |
| EP | 1 151 657 A1 | 4/2001 |
| EP | 1 151 657 | 4/2001 |

OTHER PUBLICATIONS

VERMEER 504 HE, no publication date.
Jean Viaud, U.S. Appl. No. 10/163,156, filed Jun. 4, 2002.
Philippe Lucand et al., U.S. Appl. No. 10/281,475, filed Oct. 25, 2002.

* cited by examiner

*Primary Examiner*—Derris H. Banks
*Assistant Examiner*—Shelley Self

(57) ABSTRACT

A large round baler includes a discharge or outlet gate mounted for swinging vertically about a horizontal transverse axis located approximately at the center of a baling chamber. In one of several variations, two hydraulic cylinders, that are arranged offset to each other, engage the outlet gate at various radial positions, so that both actuating devices cannot simultaneously reach a dead center or a blocking position.

11 Claims, 8 Drawing Sheets

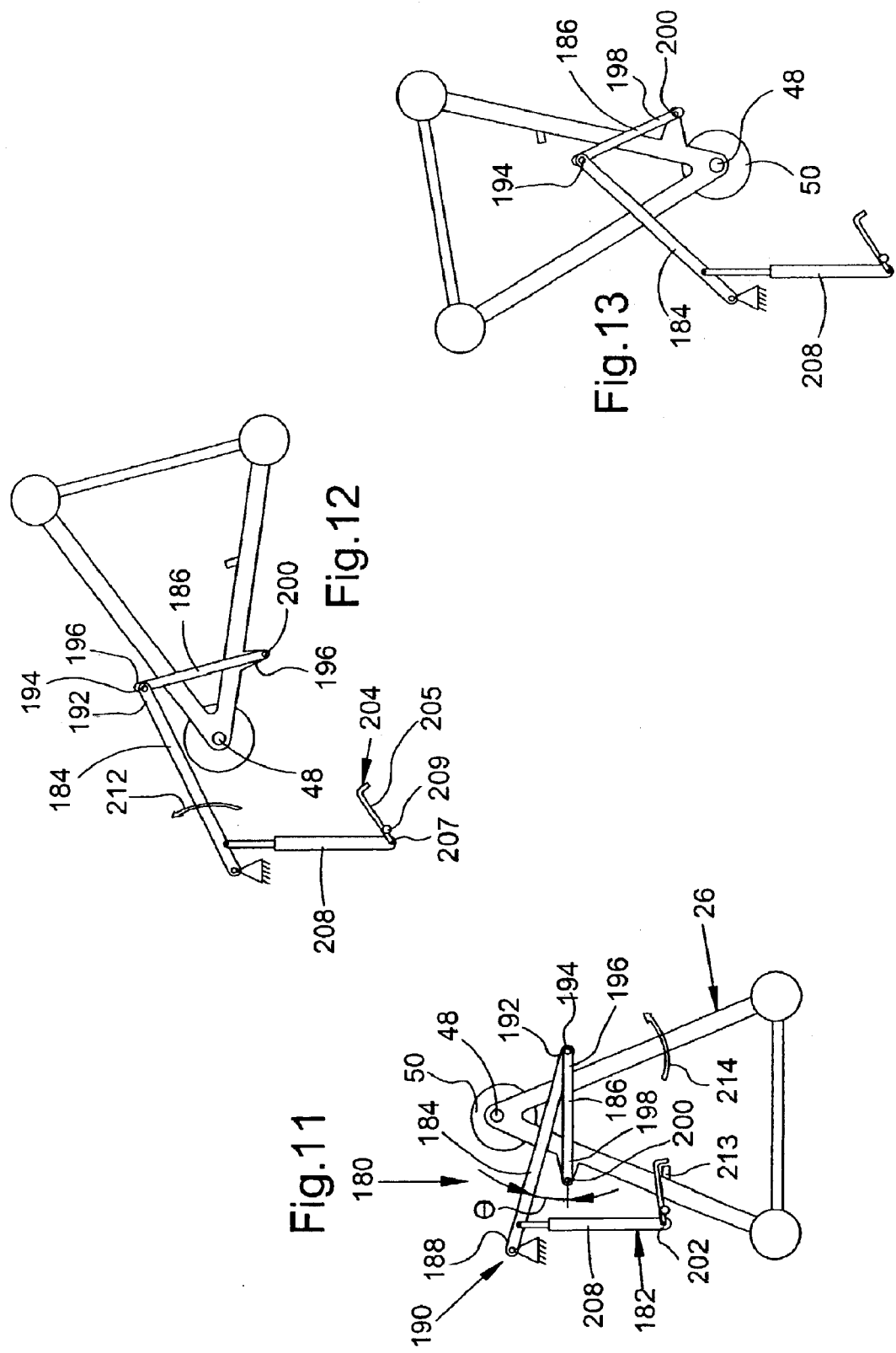

LARGE ROUND BALER

FIELD OF THE INVENTION

The invention concerns a large round baler with side walls and an outlet gate that can be pivoted about a horizontal, transverse pivot axis within the vertical extent of the side walls, where at least one extensible and retractable actuator is coupled between the baler frame and the outlet gate.

BACKGROUND OF THE INVENTION

Large round balers are known which include a baling chamber defined by fixed side walls between which extend a plurality of rolls, some of which are mounted on stationary axes and some of which are mounted on movable axes, and over which belts can be conducted. Some of the rolls are rotatably mounted to a carrier, that in turn, is pivotally mounted to the baler side walls. The belts also extend over rolls on a tensioning arm that is constantly forced into a position that applies tension to the belts. The advantage of this configuration lies in the fact that the carrier with the small number of rolls is light and does not require large positioning forces. The disadvantage, however, is that the carrier must be raised through a large distance in order to permit the finished bale to be ejected, particularly since a second set of belts is provided in the floor region on which the cylindrical bale rests during its formation.

U.S. Pat. No. 6,332,309 discloses a large round baler with only a single set of belts that are conducted over rolls on stationary axes and rolls on movable axes whose position can be varied in a fixed housing and a pivoted housing part. A tensioning arm is also provided that always maintains tension on the belts. The disadvantage of this configuration lies in the high positioning forces that are required in order to raise the movable housing part and the large positioning path that is needed in order to be able to eject the cylindrical bale from the baling chamber.

The prospectus VERMEER 504 HE, no publication date, shows a large round baler in which the pivot point of a carrier extending outside the baling chamber is located nearly in the region of the center of the baling chamber. In the outer region of the carrier, an arm is provided on which several rolls are located over which belts are conducted that can penetrate into the baling chamber. In this case, the tensioning arrangement forms several loops in which harvested crop can accumulate and cause problems.

The unpublished U.S. patent application Ser. No. 10/163, 156, filed 4 Jun. 2002, discloses a large round baler with fixed side walls outside of which arms are attached that can pivot vertically, to which two rolls are attached that are spaced at a distance from each other. Along with belts conducted over them, the rolls simultaneously form the floor of the baling chamber and can be brought into a raised position along the edges of two side walls in which a sufficiently large opening to the ground rapidly develops, through which the cylindrical bale can be ejected. A tensioning arm is provided in the forward region of the large round baler and is equipped with a spring loaded roll over, which the belts extend in the form of a loop.

From the unpublished DE 101 53 540.6, a large round baler is known whose baling means are conducted over rotating rolls on stationary axes, and in particular, rotating rolls retained in a pivoted carrier with fixed side walls. The carrier is part of an outlet gate and is provided with a rotating body about which the baling means forms a loop and can be retained during the ejection of the bale.

SUMMARY OF THE INVENTION

The problem underlying the invention consists of the need to define a simple actuating arrangement for the vertical pivoting of the outlet gate that permits a rapid ejection of the cylindrical bale.

According to the present invention, there is provided a large round baler having a discharge gate that can be quickly and efficiently moved from a lowered bale-forming position to a raised bale discharge position using at least two actuators operating sequentially.

In this way, no insuperable dead center position occurs at any point in time during the pivoting movement of the outlet gate, at which the outlet gate would have to remain. Rather, one of the bearings is always located so that a moment arm to the pivot axis exists. The arrangement of the pivot axis at a low level makes it possible to leave the side walls stationary and not to pivot them along with other components so that the required forces are reduced.

If two actuating devices are used that are offset at an angle to each other, that is, arranged so that they do not have a common line of action, it is possible that a first actuating device of the two devices is activated for a first range of pivot angles, and a second of the two actuating devices is activated for a second range of pivot angles. Thereby, a wide pivoting movement can be performed with a minimal use of force. Furthermore the control arrangement can provide, that the other actuating device of the two, can be activated to support the movement.

The embodiment of another solution consists of two steering arms of a linkage that are connected to each other in a joint each of which is loaded by an actuating device and act between a stationary bearing and the outlet gate. This solution operates with a retraction or extension of the entire linkage that is applied eccentrically to the outlet gate in order to provide its pivoting movement. Here, the actuating devices are controlled in such a way that the associated bearings are used alternately.

The possibility that the bearings of two actuating devices and the bearing of the outlet gate that is to be repositioned are all located on a straight line, and without a sideways component cannot perform any further repositioning, can be avoided if the lines of action of several actuating devices are inclined relative to each other.

In a third embodiment of a solution, the two-part linkage is provided with two steering arms that extend at a small angle to each other in a first end position. When the actuating device is actuated, the first steering arm pivots about a bearing and thereby carries along the second steering arm that acts directly upon the outlet gate whose pivoting movement continues. This solution requires only an actuating device that can pivot the outlet gate over a wide range of pivoting angles.

It is advantageous if the two steering arms that lie opposite each other, side by side, are connected to each other by means of a clasp or the like in the form of a U-shaped bow that avoids twisting so that one actuating device for the carriers on both sides is sufficient in order to perform a pivoting movement over a second range of pivoting angles.

Since one of the steering arms is provided with legs that extend at an angle to each other and the actuating device acts between the other steering arm and the end region of the leg extending at an angle to it, there results at all times a force triangle that avoids dead center or blocking positions.

A high bale density is attained if the outlet gate is retained by means of a locking arrangement in the closed position, and thereby, the incoming crop increases the density more and more. Manufacturing costs are minimized and the process of unloading the bale is simplified if the locking arrangement is repositioned simultaneously with the actuating device that is already available anyway.

The weight of the large round baler is essentially equal on both sides if two actuating devices are used that are provided to the right and to the left.

The use of double-acting actuating devices has the advantage that the downward movement of the outlet gate due to gravity can also be controlled. Furthermore, in the case that a locking arrangement is available, this can not only be opened but actively closed and retained.

BRIEF DESCRIPTION OF THE DRAWINGS

The drawing shows embodiments of the invention that shall be described in greater detail in the following.

FIGS. 11–13 are schematic views of an actuating arrangement according to a third embodiment with a two-piece linkage and an actuating device for the outlet gate respectively located in a first end position, an intermediate position, and a second end position.

DESCRIPTION OF THE PREFERRED EMBODIMENT

Figure 1:
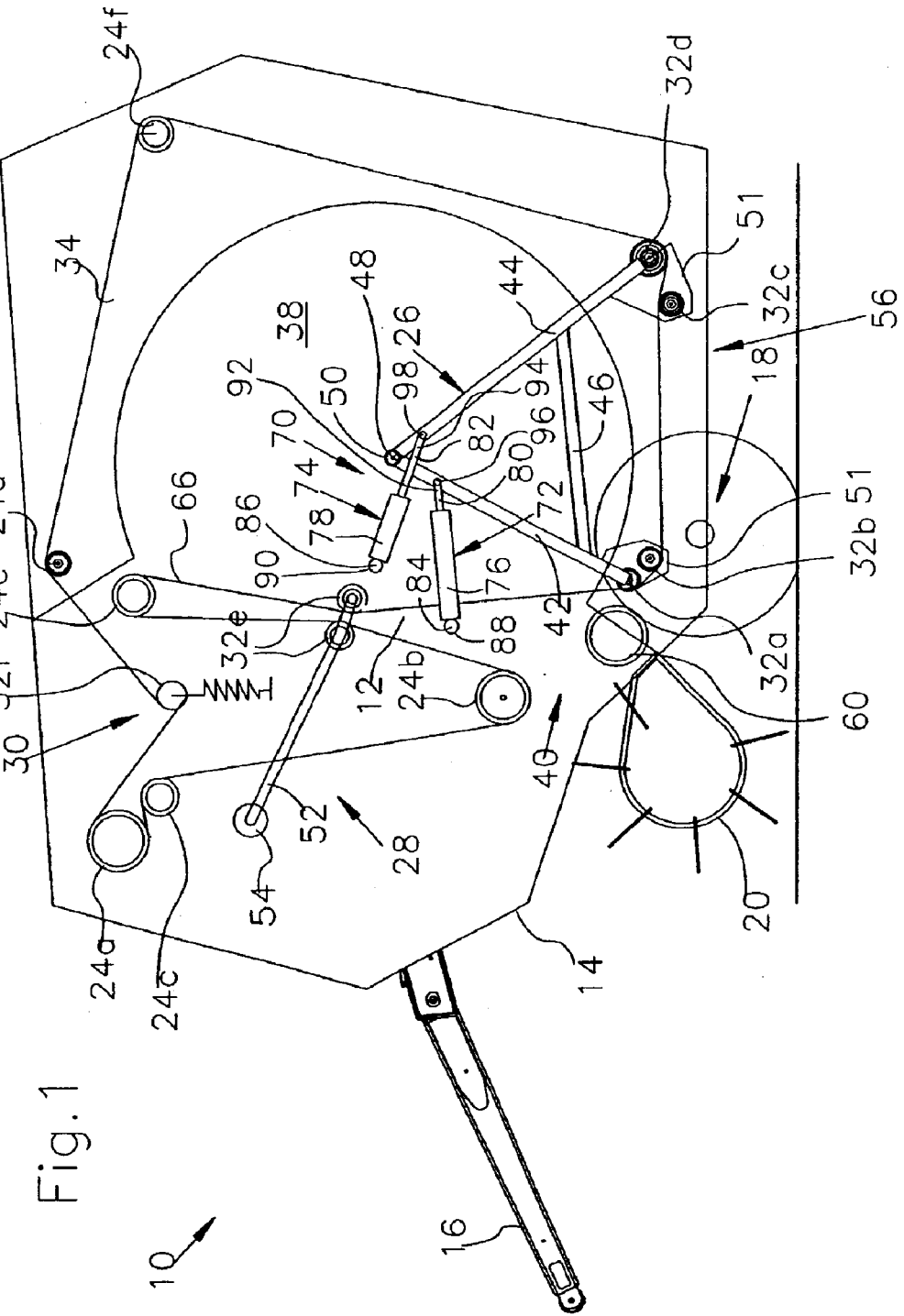
FIG. 1 is a schematic, left side view of a large round baler in an empty operating condition.

Referring now to FIG. 1, there is shown an agricultural large round baler 10 with a baling chamber 12. The baler 10 includes, among other items, the following components: a chassis 14, a towbar 16, a running gear 18, a take-up arrangement 20, fixed-axis bodies or rolls 24, a carrier 26, a tensioning mechanism 28, a second tensioning mechanism 30, movable-axis bodies or rolls 32, and bale-forming element(s) 34.

The large round baler 10 is used to take up harvested crop, such as straw and hay, that is rolled upon itself in a helical shape to a circular cylindrical bale 36 (FIG. 2) and is bound and subsequently deposited on the ground. While the bale 36 is being ejected from the baling chamber 12, the take-up and baling process is interrupted.

The baling chamber 12 can be varied in its size, that is, its diameter increases with the size of the bale 36. While the baling chamber 12 is essentially surrounded by the bale-forming element(s) 34, it is enclosed at its sides by side walls 38. In an embodiment, not shown, a second bale-forming arrangement is provided underneath the baling chamber 12 on which the bale 36 rests partially or entirely.

The chassis 14 is configured in known manner as a weldment that holds or carries the towbar 16, the running gear 18, the take-up arrangement 20, the fixed-axis rolls 24, the carrier 26, the tensioning mechanism 28, the second tensioning mechanism 30, and the side walls 38. For this purpose, transverse struts, not shown, are provided that assure a stiff spatial assembly. The configuration of the chassis 14 itself is conventional in nature.

The towbar 16 is used to connect the chassis 14 to a towing vehicle, not shown, for example an agricultural tractor.

The running gear 18 includes, in each case, not particularly characterized, an axle and wheels, with which the chassis 14 is supported on the ground. The running gear 18 is rigidly connected, if necessary spring-supported, to the chassis 14.

The take-up arrangement 20 is configured in a conventional manner as a so-called pick-up that takes up crop lying on the ground with circulating tines and conveys it to the rear in the direction of the baling chamber 12. In addition, a cutting arrangement, also of known construction, may be provided downstream that reduces the crop on the path between the take-up arrangement 20 and an inlet 40 in the baling chamber 12.

In this special embodiment, a total of six fixed-axis rolls are provided. In particular, provided are a forward upper roll 24a, a forward lower roll 24b, a forward intermediate roll 24c, a center upper roll 24d, a center lower roll 24e, and a rear roll 24f. The fixed-axis rolls 24a–24f are configured as pulleys or rolls of steel, and if affordable, coated with plastic. The rolls 24a–24f are either supported in bearings on an axle, free to rotate, or are provided with stub shafts that are accommodated in bearings in the chassis 14, free to rotate. The rolls 24a–24f have varying diameters and are provided, if necessary, with guide means, such as bridges, projections or the like for the bale-forming element(s) 34. The rotating rolls 24a–24f extend at least over the entire width of the baling chamber 12, and if necessary, beyond that. At least one of the rotating rolls 24a–24f can be driven. All of the fixed-axis rotating rolls, except for the forward lower rotating roll 24b, are located close to a generally horizontal plane above the baling chamber 12. The rear rotating body 24f is located in an upper rear corner region of the chassis 14 and is approximately equidistant from the rotating rolls 32c, 32d when the carrier 26 is located in its end positions.

The carrier 26 is generally in the shape of a triangle with first and second legs 42 and 44, respectively, that are rigidly connected by means of a cross brace 46. The first and the second legs 42 and 44 meet in, but diverge from each other radially away from, a bearing 48 that engages a bearing part 50 on the outside of the side wall 38. The bearing part 50 is located directly in or close to the center of the baling chamber 12 or the side wall 38. In any case, the pivot axis of the bearing part 50 is located within the vertical extent of the side walls 38. On each side of the large round baler 10, a carrier 26 and a bearing part 50 is provided in each case on the outer side of the side wall 38. On the radially outer end region of the first leg 42, first and second rotating rolls 32a and 32b, respectively, are provided, and on the radially outer end region of the second leg 44, third and fourth rotating rolls 32c and 32d respectively are provided. Each of the rolls 32a–32d are thus mounted to the carrier 26 so as to rotate freely. The four rotating rolls 32a through 32d extend on parallel axes, and in each case, at a small distance to each other. The first rotating roll 32a is attached directly to the forward leg 42, and the third rotating roll 32d is attached directly to the second leg 44, while each of the associated rotating rolls 32b and 32c are each attached to an arm 51 projecting from each of the legs 42 and 44. The second rotating roll 32b of the first leg 42 is located further radially outward from the bearing 48 than the first rotating roll 32a. The carrier 26 can pivot between two end positions, that is, a lower position in which the rotating rolls 32a through 32d are located generally near a horizontal plane underneath the baling chamber 12 and a position offset almost 180° upward, in which the rotating rolls 32c and 32d of the second leg 44 come to lie between the stationary center upper roll 24d and the stationary rear roll 24f—see FIG. 4. The rotating rolls 32a through 32d are configured similarly to the rotating rolls 24a through 24f and also extend at least over the width of the baling chamber 12. The maximum radial extent of the carrier 26, beginning from the bearing part 50, is less than the distance between the bearing part 50 and the fixed rear roll 24f. Instead of lattice work, the carrier 26 can also be configured with flat surfaces, and thereby simultaneously form the side wall 38. The carrier 26 arranged on both sides of the large round baler 10, the rotating rolls 32a through 32d, as well as the spans of the bale-forming element(s) 34 arranged between the rotating rolls 32a and 32d, form an outlet or discharge gate 56 that can be raised in order to be able to eject a completed bale 36 from the baling chamber 12 and to deposit it on the ground.

The tensioning mechanism 28 includes a tensioning arm 52, two rolls 32e respectively on a pair of movable axes, that are spaced away from each other and a tensioning element, not shown. The tensioning arm 52 and the tensioning element are located, in each case, once on each side of the large round baler 10. In this embodiment, each tensioning arm 52 is supported in a bearing 54 so as to pivot vertically in the region between the forward, lower fixed roll 24b, and the forward, intermediate fixed roll 24c and extends vertically up to just below the center lower fixed roll 24e. The pair of rotating rolls 32e are located on the radially outer end region of the tensioning arm 52. The tensioning element is configured in the usual manner as a mechanical spring or as a hydraulic motor that can be moved against a possibly variable resistance. Such a resistance, in the case where a hydraulic motor is used as a tensioning element, can be accomplished through the operation of a variable restrictor or throttle in a hydraulic circuit, as this is known in itself. The magnitude of the resistance simultaneously determines the density and the maximum weight of the bale 36. The tensioning arm 52 is configured or arranged in such a way that it does not collide with the carrier 26. The tensioning arms 52 are preferably connected to each other, stiff against twisting, in the region of the rotating rolls 32e and pivot together in the shape of an inverted "U".

The second tensioning mechanism 30 is shown, more symbolically than structurally, and contains a spring loaded rotating body 32f that maintains a constant tension in the bale-forming element(s) 34, in addition to the tensioning mechanism 28, and does not necessarily require a control arrangement.

The rotating rolls 32a through 32f, are arranged on movable axes where their position is a function of the tension in the bale-forming element(s) 34 and the position of the carrier 26. The rotating rolls 32a through 32d, that are supported in bearings on the carrier 26, extend at least completely over the baling chamber 12, so that they can be moved on the outer edge of the rear part of the side walls 38 or with a spacing to the latter.

Figure 3:
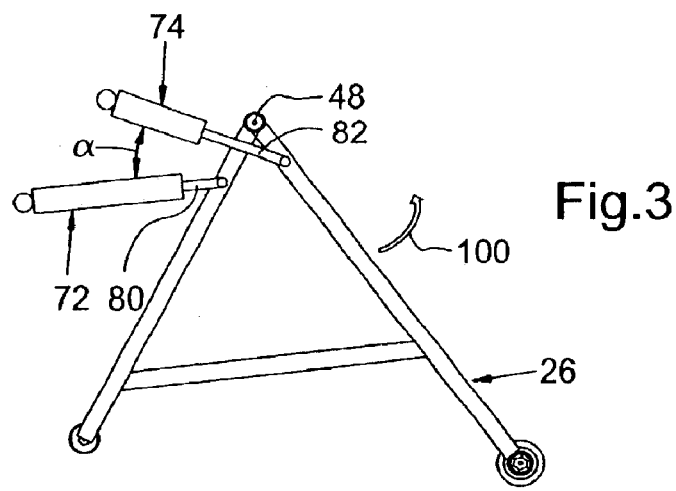
FIGS. 3–5 are schematic side views of the two actuating devices on the outlet gate and respectively showing the assembly in a first end, an intermediate, and a second end position.

In this embodiment, a plurality of bale-forming elements 34 are respectively defined by a multitude of narrow, flat, flexible belts provided in a parallel, side-by-side arrangement, as is known in itself. These bale-forming elements 34 each extend, among others, over the fixed-axis rotating rolls 24a–24f and over the movable-axis rotating rolls 32a–32e, and at all times is applied by the tensioning mechanisms 28 and 30 so tightly to the at least one fixed-axis roll 24b, which is normally the driven roll, so as to guarantee that the bale-forming elements 34 will be driven or carried along. As shown in the illustration of FIGS. 1 and 3, the bale-forming element(s) 34 can occupy an initial position in which a generally vertical inlet 40 is formed to a triangular baling chamber 12, and an end position in which it wraps itself as a large loop around the bale 36. When the baling chamber 12 is empty, as shown in FIG. 1, the course of the bale-forming element(s) 34, starting from the rear fixed axis roll 24f and proceeding in the clockwise direction is as follows: Over the roll 24f, under the roll 32d, over the roll 32c, under the rolls 32b and 32a, between the rolls 32e, over the central fixed-axis roll 24e, down between the rotating rolls 32e, under the lower front fixed-axis roll 24b, over the intermediate front fixed-axis roll 24c, and then through 240 °around a forward section of the upper front fixed-axis roll 24a, under the roll 32f of the second tensioning mechanism 30, over the upper center rotating fixed-axis roll 24d, and finally back to the upper rear fixed-axis roll 24f.

During its formation, the bale 36 is located in the baling chamber 12 and is largely surrounded by the bale-forming element(s) 34, but falls to the ground out of the baling chamber 12, that is, the space between the side walls 38, as soon as the carrier 26, together with the rolls 32a through 32d, pivots upward in the counterclockwise direction, as seen in the drawing.

The side walls 38 correspond in their size and shape generally to the end faces of a completed bale 36 in its largest dimension, at least in the rear region. The side walls 38 are configured separately from the chassis 14, where the chassis 14 may be provided with its own side walls, that function largely as protective shielding. In contrast to a large part of the state of the art, the side walls 38 extend as one-piece components over the entire end face of the baling chamber 12. Obviously, several parts may be combined, for example, for reasons of manufacture, in order to generate a one-piece side wall 38. The side walls 38 are preferably formed of steel sheet, extend to the rear, if necessary diverging slightly, and are welded at appropriate locations. Furthermore, the side walls 38 may be supported in bearings so as to move to a limited degree transverse to the direction of operation so that they reduce the contact force of the bale 36 to their inner side during its ejection so that it can be ejected more easily and hence, more rapidly. It would be sufficient, for example, if the side walls 38 were to be separated from each other by a few centimeters. This characteristic can be performed for itself alone and represents an innovation in itself. The side walls 38 may be configured as movable with the carriers 26.

The inlet 40 is formed at its top by the forward lower roll 24b, with the bale-forming element(s) 34 conducted over it, and at the bottom by a roll 60. Indeed, the bottom border of the inlet 40 could alternatively be formed by the roll 32a. The inlet 40 generally represents the location at which the circumference of the bale 36 is not surrounded by the bale-forming element(s) 34.

The roll 60, which is preferably driven, is provided downstream of, and adjacent to, the take-up arrangement 20. The roll 60 is preferably equipped on its circumferential surface with drivers, not described in any further detail, that guarantee a safe transport of the harvested crop between the take-up arrangement 20 and the baling chamber 12. This roll 60 forms the lower border of the inlet 40 and is spaced from the roll 24b which forms the opposite upper border of the inlet 40. Further, the roll 60 is immediately adjacent to the first roll 32a on the first leg 42 when the carrier 26 is located in its lower forward end position.

On the basis of the above description, the first embodiment of the large round baler 10 operates as follows.

As long as no crop is being conducted to the large round baler 10 and the baling chamber 12 is empty, the carrier 26 is located in its lower, forward end position, wherein the first roll 32a that is located on the first leg 42 is near the roll 60, and the rotating rolls 32a-32d are located close to a generally horizontal plane. The tensioning arm 52 is forced to the rear and downward so that it is inclined approximately 30° from the horizontal and disposes the rolls 32e at a central location between the fixed-axis rollers 24b and 24e. Between the rotating rolls 32e, carried by the pivotable tensioning arm 52 and the lower central fixed-axis roll 24e, the bale-forming element(s) 34 forms a loop 66. Finally, a section of the bale-forming element(s) 34, extends from the front side of the movable roll 32e to the front side of the movable roll 32a at a location adjacent a rear side of the fixed-axis roll 60, whereby this section is disposed in rearward spaced relationship to the inlet 40. This condition corresponds to that shown in FIG. 1.

As soon as harvested crop is conveyed over the take-up arrangement 20 to the baling chamber 12, it will deflect the section of the bale-forming element(s) 34 that is spaced rearward of the inlet 40 towards the interior of the baling chamber 12 which has the effect that the tensioning arm 52 begins to move upward in order to shorten the initially large loop 66. As the diameter of the bale 36 increases, the tensioning arm 52 moves further upward until it finally occupies its position shown in FIG. 2. While the diameter of the bale 36 increases, the carrier 26 remains in the end position shown in FIG. 1.

Figure 2:
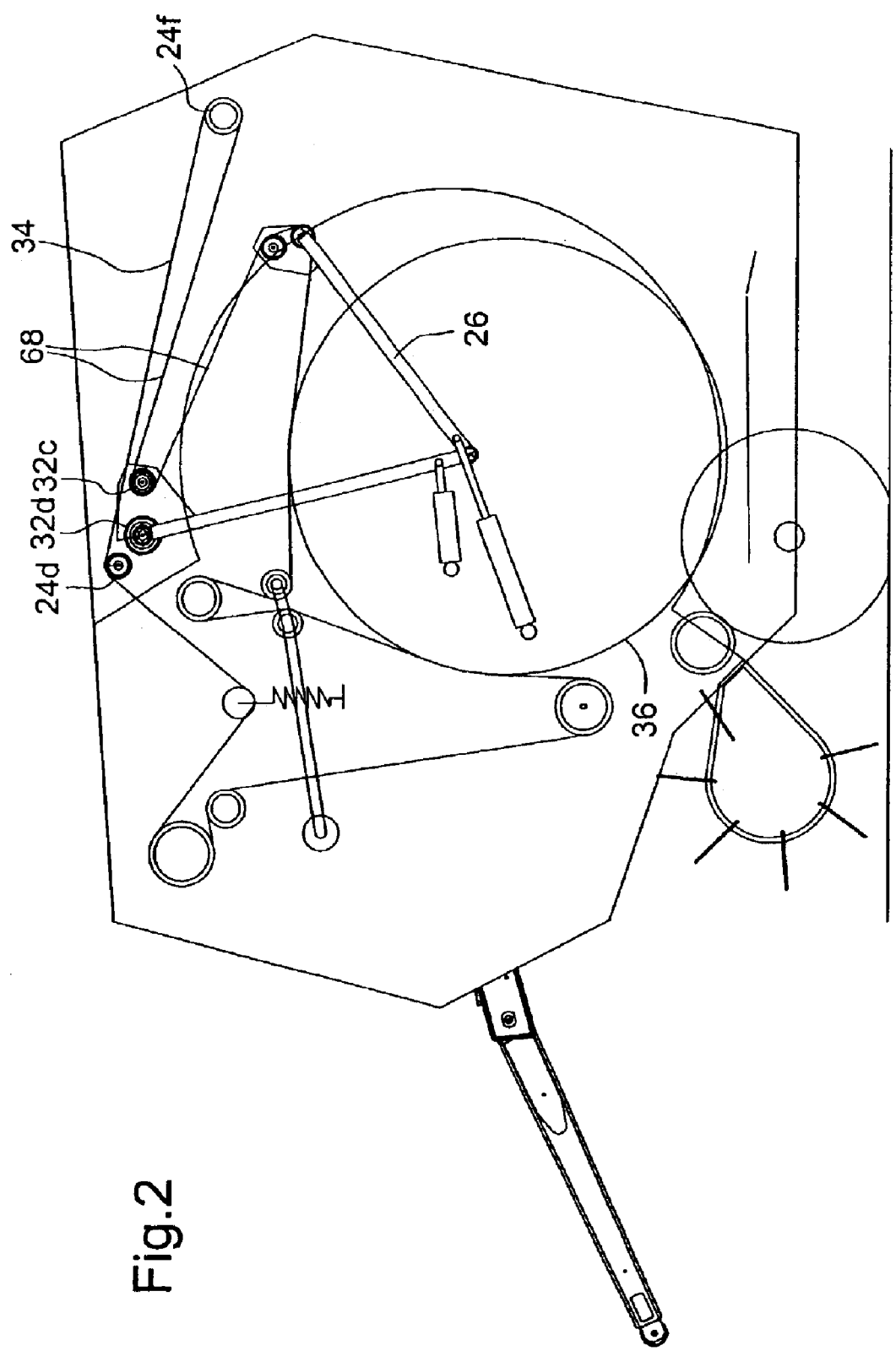
FIG. 2 is a view of the large round baler, like that of FIG. 1, but showing the baler during the unloading process when equipped with a gate actuating arrangement constructed according to a first embodiment including two actuators.

When the bale 36 has reached its largest diameter, as shown in FIG. 2, the bale 36 rests at the front on the roll 60 and the adjoining first rotating roll 32a. Otherwise, the bale 36 is retained by the tension in the bale-forming element(s) 34 out of contact with the third and the fourth rotating rolls 32c and 32d, respectively, and the sections of the belts extending over them. If necessary, a further roll, not shown, may be provided between the two second legs 44 on which the bale 36 can rest. Due to the radial offset of the first and the second rotating rolls 32a and 32b on the first leg 42, the adjoining spans of the bale-forming element(s) 34 will be held out of engagement. In this condition, the bale 36 can be bound or wrapped with foil or net so that it does not fall apart after it leaves the baling chamber 12.

After the bale 36 is fully formed, it can be ejected from the baling chamber 12, for which purpose the carrier 26 is pivoted to the rear and upward in the counterclockwise direction. Particularly on the basis of the connection in joints of the carrier 26, in or close to the center of the side walls 38, the bale 36 will fall to the ground after only a short pivoting path of the carrier 26 of, for example, approximately 90°. After a pivoting path of, for example, approximately 180°, the first rotating body 32a is located on the first leg 42 at such a distance above the ground that the large round baler 10 can be operated further in the forward direction, without touching the bale 36. When the carrier 26 is located in its upper end position, the bale-forming element(s) 34 forms a second loop 68 about the rotating body 32c so that the section of the bale-forming element(s) 34, previously slung about the bale 36, is absorbed by this second loop 68, and the bale-forming element(s) 34 remains held under tension. In this situation, the first and the second rotating rolls 32a, 32b are located between the upper center rotating roll 24d and the rear rotating roll 24f.

As soon as the bale 36 has been rolled out of the baling chamber 12, the carrier 26 is again pivoted downward into the position shown in FIG. 1. Because no bale 36 is present, the tensioning arms 34 again move downward so that the size of the loop 66 increases.

In place of the large round baler 10 with a baling chamber 12 of variable size, described so far, a conventional large round baler, with a baling chamber that is not variable in its size, could be used, and with it, surrounding rolls or similar baling elements, in which the carrier 26 is attached, so as to pivot at a relatively deep level, that is, within the vertical extent of the side walls 38. Indeed actuating arrangements described later together with the large round baler 10, described so far, represent a particularly favorable combination.

FIGS. 1 and 2 show the carrier 26 of the discharge or outlet gate 56 with an actuating arrangement 70 that is provided with two actuating devices 72 and 74 that in this case are operated hydraulically. The hydraulic actuating devices 72 and 74 are respectively provided cylinders 76 and 78 and pistons 80 and 82 that can be actuated by means of hydraulic connections, not shown. End regions 84 and 86, respectively, of the cylinders 76 and 78 are respectively coupled so as to pivot freely from bearings 88 and 90 of the chassis 14 or the side walls 38 of the large round baler 10. End regions 92 and 94, respectively, of the pistons 80 and 82 are fastened, free to pivot, to bearings 96 and 98 of the legs 42 and 44. It would be sufficient to let the actuating devices 72 and 74 engage only one leg 42 or 44 or a strut between the two.

The interaction between the hydraulic actuating devices 72 and 74 and the carrier 26 shall now be explained in greater detail on the basis FIGS. 6 through 9. The actuating devices 72 and 74 could also be configured as electrical stepper motors. A single-acting configuration is adequate; indeed, by means of a double-acting configuration of the actuating devices 72 and 74, a support of the particular other actuating device 72 or 74 can be provided, whereby a faster repositioning becomes possible and/or smaller forces need be applied. While the bearing 88 of the lower actuating device 72 is provided underneath the bearing 48, that of the upper actuating device 74 is located slightly above the bearing 48. In the position shown in FIG. 5, both lines of action extend underneath the bearing 48. When the bearing 48 is described here, the meaning applies to the bearing axis, that is, the pivot axis of the carrier 26.

FIG. 3 shows the carrier 26 and the hydraulic actuating devices 72 and 74 separated from the large round baler 10 and in a first, lower end position. In this first end position, the actuating devices 72 and 74 are located at an angle α to each other and hence do not have a common line of action. If the first actuating device 72 extends its piston 80, then the carrier 26 is forced to pivot about the bearing 48 in the direction of the arrow 100, that is, in the counterclockwise direction. During this process, the actuating device 74 is placed in a float conditioning permitting the piston 82 to move freely. In the case of a single-acting configuration, the actuating device 74 can move freely and is initially extended and subsequently retracted.

Figure 4:
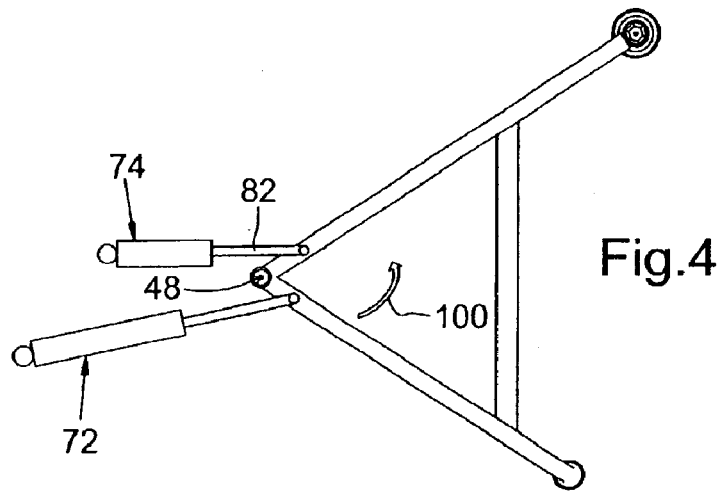
Figure 5:
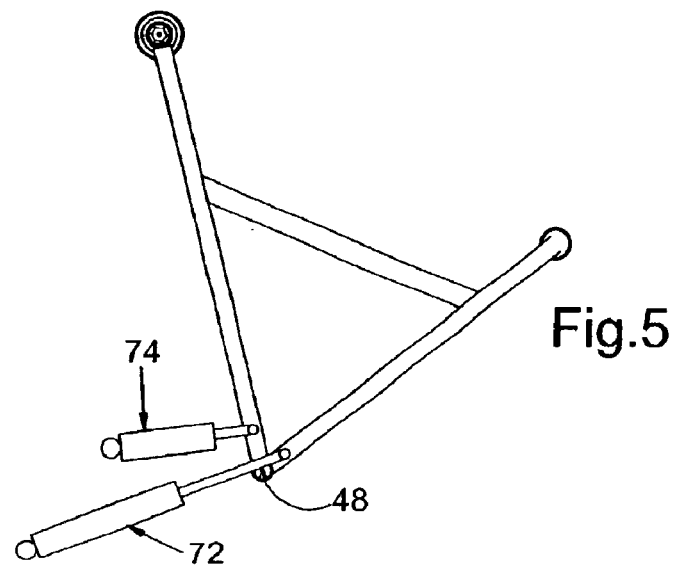

FIG. 4 shows the carrier 26 moved to an intermediate position, due to powered extension of the extended piston 80. In this position, the line of action of the upper actuating device 74 is located above the bearing 48, and its pivot axis and the line of action of the lower actuating device 72, is located underneath it; thereby, the actuating devices 72 and 74 can act on both sides of the bearing 48. On the path to that point, the upper actuating device 74 has taken up its extension in length which it reaches when its bearings 90 and 98 and also the central axis of the bearing 48 are located along a straight line. Now, the second actuating device 74 is activated and the piston 82 is retracted. Thereby, the carrier 26 is forced to pivot further in the direction of the arrow 100 into a second, upper end position, as shown in FIG. 5. During the pivoting process, the first actuating device 72 is now released of its pressure, in the case of a single-acting configuration. Both actuating devices 72 and 74 can remain active as they maintain a sideways distance to the pivot axis of the bearing 48 and do not intersect it, in particular, in the case of a single-acting configuration only in one direction and in the case of a double-acting configuration in both directions.

FIG. 5 shows the upper end position of the carrier 26. In this end position, the bale 36 can safely fall out of the large round baler 10. There is an angle of approximately 190° between the lower and upper end positions. The carrier 26 reaches from the upper end position to the lower, resting end position by pivoting in the reverse direction, where the actuating devices 72 and 74 interact at least initially in reverse order and a reverse way, while the remainder of the path is covered on the basis of gravity. If however, a controlled movement of the carrier 26 is required, the actuating devices 72 and 74 must be controlled or regulated.

Figure 6:
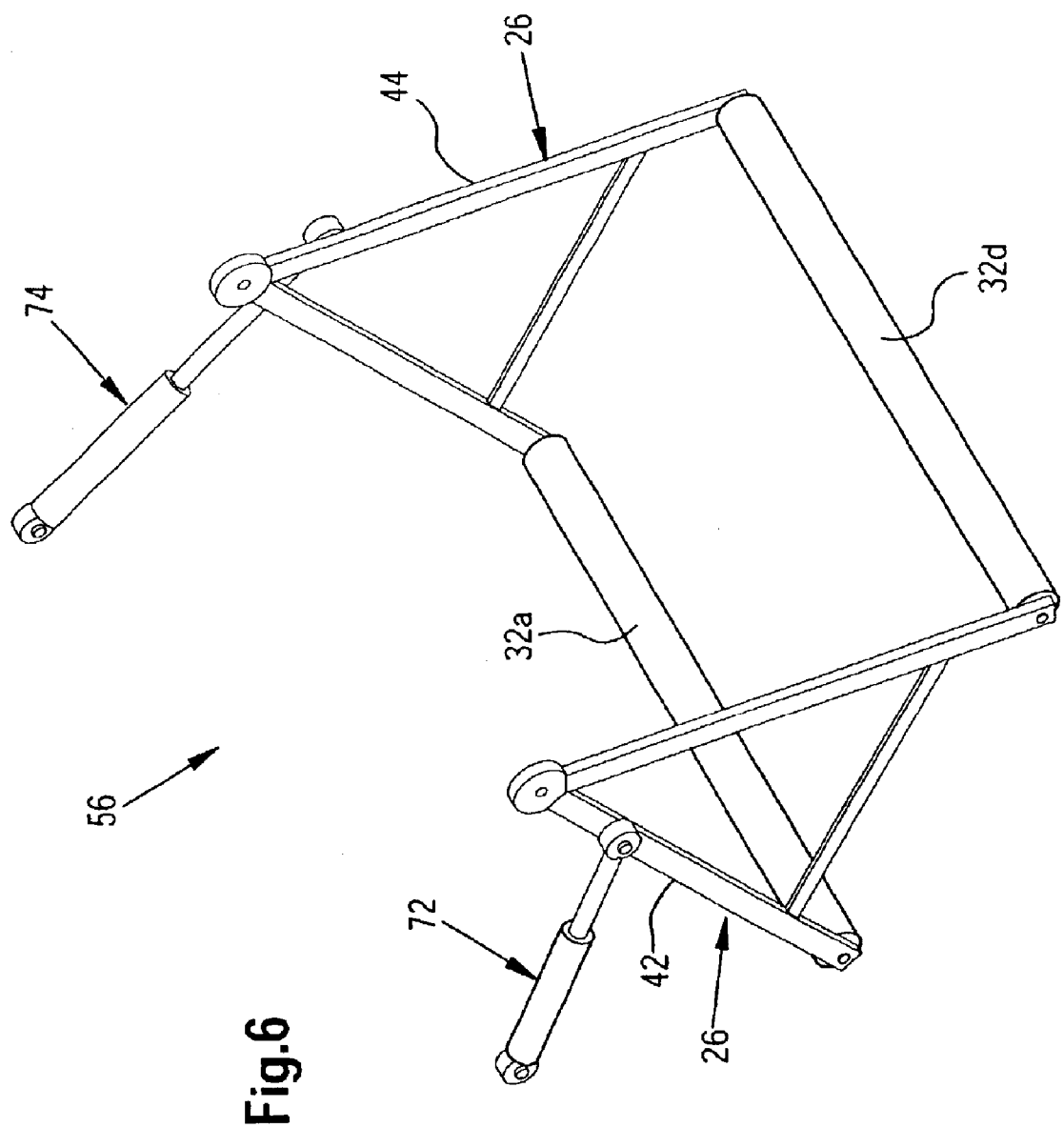
FIG. 6 is a perspective view of the outlet gate and the two actuating devices.
Figure 7:
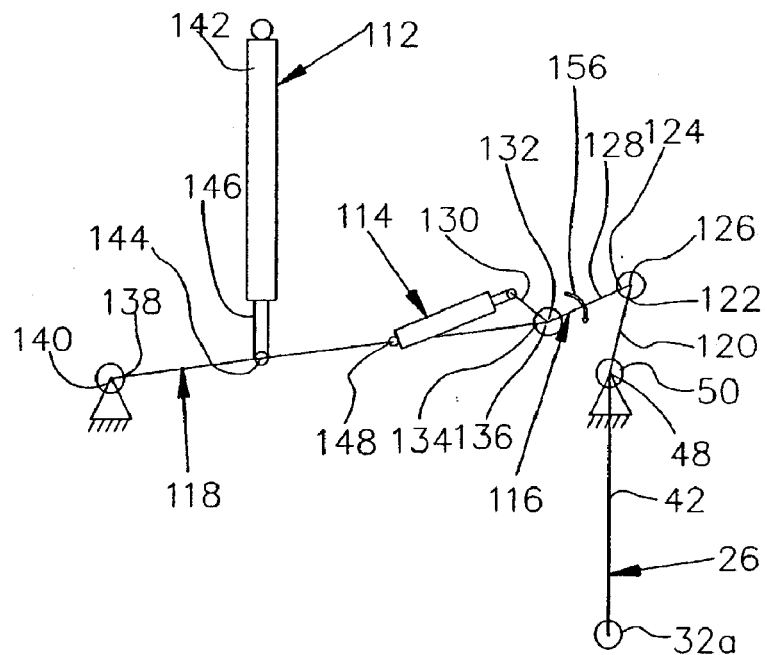
FIGS. 7–9 are schematic side views of an actuating device according to a second embodiment with a two-piece linkage and with two actuating devices for the outlet gate, respectively in first end, intermediate, and second end positions.

FIG. 6 shows that a carrier 26 is provided on each side of the large round baler 10, in particular, in each case, on the outer side of the side wall 38. Unlike FIGS. 3 through 5, the two actuating devices 72 and 74 are distributed in each case such that the device 72 is coupled to the leg 42 on the one side of the baler, while the other device 74 is coupled to the other leg 44 on the opposite side of the baler. The two carriers 26 and the rotating rolls 32a and 32d form the outlet gate 56.

In other variations, not shown, provision is made that the two actuating devices 72 and 74 are arranged on the one carrier 26 or a total of four actuating devices 72 and 74 are arranged in each case on each leg 42 and 44.

The embodiment according to FIGS. 1 through 6 is based on the principle that two actuating devices 72 and 74 are arranged in such a way that one of these can act when the other reaches a dead center position, in which the pivot axis of the carrier 26 that is to be pivoted is located on the line of action of one or the other of the actuating devices 72 and 74.

The illustrations of FIGS. 7 through 14 are more schematic in nature and therefore deviate in their dimensions and proportions from the illustrations integrated into the large round baler according to FIGS. 1 and 2.

FIGS. 7 through 10 show an actuating arrangement 110, according to a second embodiment, with two actuating devices 112 and 114 and a two-piece linkage defined by a first steering arm 116 and a second steering arm 118 for the carrier 26, which is shown here with only one leg 42 for the sake of simplicity. The carrier 26 pivots about the bearing 48 and is provided with an extension 120 generally in the direction of its leg 42 beyond the bearing 48. In an end region 122 of the extension 120, facing away from the leg 42, the extension 120 is fastened to an end region 124 of the first steering arm 116. The end regions 122 and 124 are connected to each other over a bearing 126, free to pivot. The first steering arm 116 is provided with two legs 128 and 130 that extend at an angle of 130° to each other and in whose bend 132 a first end region 134 of the second steering arm 118 is fastened. The end region 134 and the bend 132 are connected to each other over a bearing 136, free to pivot. A second end region 138 of the second steering arm 118 is fastened over a bearing 140 to the side wall 38 or the chassis 14, free to pivot. The actuating device 112 is fastened with an end region 142 to the side wall 38 of the large round baler 10 or its chassis 14, free to pivot, and has a second region 144 of an axially movable piston 146 coupled approximately at the center of the second steering arm 118. The second actuating device 114 has an end 148 which is coupled approximately at the center of the steering arm 118 and furthermore is coupled with its second end region 150, that of the piston 152, with an end region 154 of the projecting leg 130 of the first steering arm 116. The actuating devices 112 and 114, the steering arms 116 and 118, and the leg 42 extend in each case generally in a vertical plane, and the pivot axes of the bearings 140, 136, 126, and 48 extend at least generally parallel to each other.

In order to pivot the carrier 26 from a lower end position into an upper end position, the piston 152 is extended and the first steering arm 116 is pivoted about the bearing 136, in the clockwise direction, as seen in the drawing. The leg 128 of the first steering arm 116 that initially extends approximately parallel to the second steering arm 118, pivots in the direction 156, that is, in the clockwise direction about the bearing 136. This pivoting continues until approximately a right angle is reached between the leg 128 and the second steering arm 118. During this process, the actuating device 112 initially remains in its position. This pivoting process has the result that the leg 42 or the carrier 26 pivots about the bearing 48 or its pivot axis in the counterclockwise direction until it reaches a position approximately midway between its end positions, as shown in FIG. 8.

Figure 8:
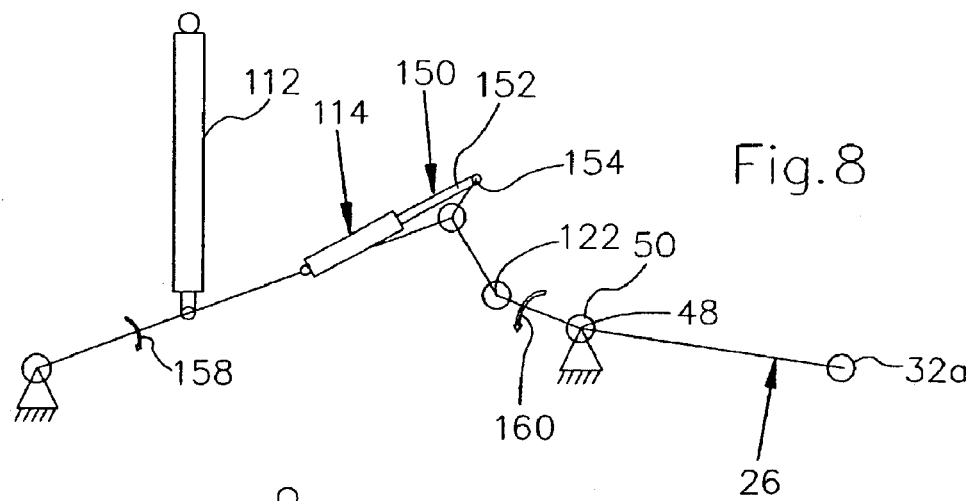

FIG. 8 shows the carrier 26 pivoted through approximately 90° to the rear and upward. Now the actuating device 114 is switched to a rigid condition, and the piston 146 of the actuating device 112 is extended. Thereby, the second steering arm 118 is pivoted in the direction 158, that is, in the clockwise direction. The first steering arm 116 is pivoted in this same direction 158, however, on the basis of its different connection in joints, it is carried along in the counterclockwise direction and thereby, the end region 122 of the extension 120 of the carrier 26 is forced about the bearing 48 in the direction 160. Finally, the actuating device 114 is also retracted again so that the first leg 128 of the first steering arm 116 extends nearly in the same direction as the second steering arm 118. Thereby, the carrier 26 is pivoted upward in counterclockwise direction and occupies a second, upper end position that is located offset through approximately 190° to 200° from the first end position. Obviously, the actuating devices 112 and 114 must not be actuated successively; rather, they may be operated simultaneously where a goal is to perform a uniform movement and no jerking movement of the carrier 26 is to be attained. This simultaneous movement can be attained in particular by means of a computer-controlled control or regulating arrangement that operates upon hydraulic valves, in any case, not shown, for the operation of the actuating devices 112 and 114.

Figure 9:
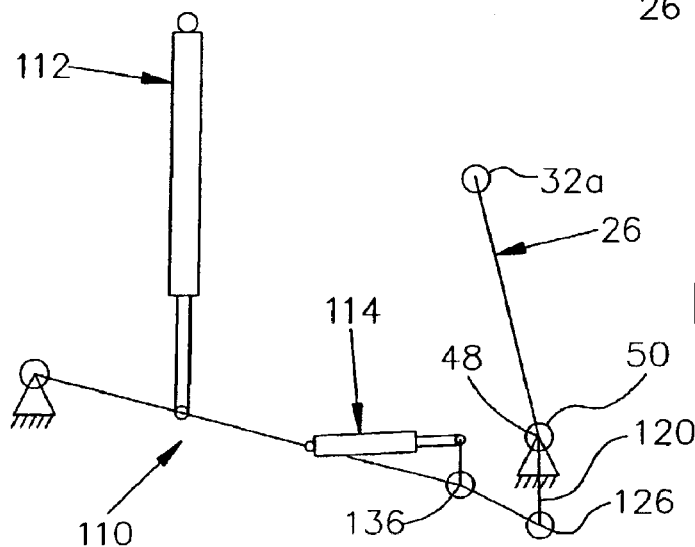

FIG. 9 shows the second end position of the carrier 26 that is offset approximately 200° from the first end position. The carrier 26 reaches from the upper end position to the first, lower end position by pivoting backwards where the actuating devices 112 and 114 interact in the opposite order and way. In this case, the force of gravity also moves the carrier 26 downward where the actuating devices 112 and 114 can control this downward movement.

Figure 10:
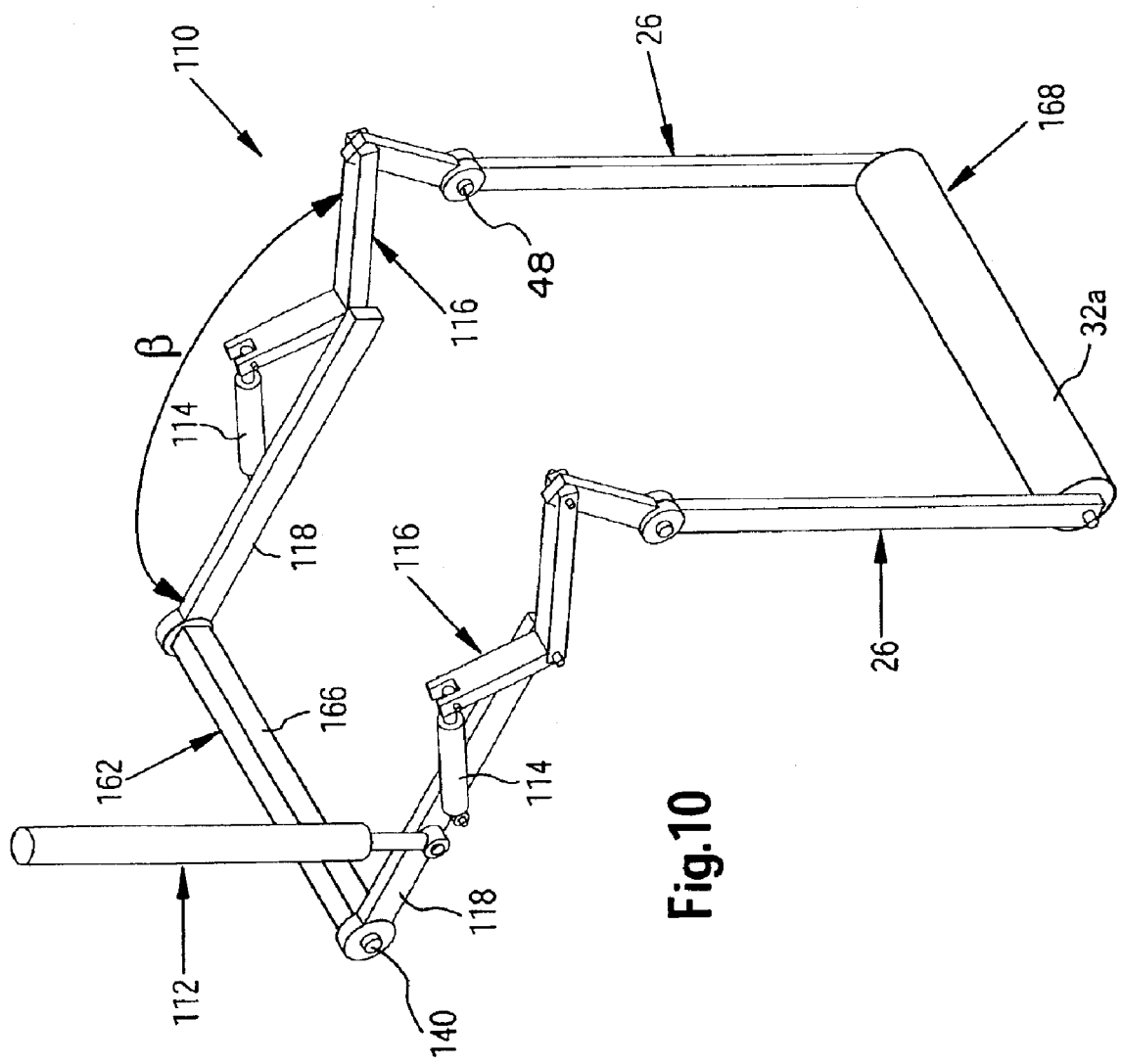
FIG. 10 shows a perspective view of the actuating arrangement according to FIG. 7 with the two-piece linkage and the actuating devices for the outlet gate located in a first end position.

FIG. 10 shows the entire actuating arrangement 110 with the second steering arm 118 that is part of a U-shaped bow 162 with a second steering arm 118 and a clasp 166. The U-shaped bow 162 overlaps the chassis 14 in such a way that the steering arms 118 and the clasp 166 are arranged on or at the outer sides of the two side walls 38. The carrier 26 is part of the outlet or discharge gate 56 that is provided with the second carrier 26 and between the two carriers 26 the rotating body 32a. The two carriers 26, the rotating body 32a, the U-shaped bow 162, the second steering arms 118, and the two actuating devices 112 and 114 are arranged symmetrically about the vertical longitudinal center plane of the large round baler 10.

As long as the clasp 166 is configured sufficiently stiff, one actuating device 112 on one of the steering arms 118 is sufficient. In this operating condition, the second steering arm 118 and the first steering arm 116 extend at an angle β of approximately 178° to each other, so that in the first end position, they occupy a generally extended position.

FIGS. 11 through 14 show an actuating arrangement 180 according to a third embodiment with an actuating device 182 and a two-piece linkage defined by a first steering arm 184 and a second steering arm 186. The first steering arm 184 has an end region 188 (in FIG. 11 on the left) fastened over a bearing 190 to the side wall 38 or the chassis 14, free to pivot, and a second end region 192 fastened over a bearing 194 to a first end region 196 of the second steering arm 186, free to pivot. A second end region 198 of the steering arm 186 is fastened to a bearing 200, free to pivot. The bearing 200 is part of the carrier 26 or is fastened to it. The arrangement of the steering arms 184 and 186 is selected in such a way that in a lower end position of the carrier 26, the two bearings 194 and 200 are spaced below and respectively forwardly and rearwardly of the pivot axis of the bearing 48. Further, the two steering arms 184 and 186 nearly overlap each other. In this way the spacing of each of one of the bearings 194 and 200 forms a moment arm for each pivot axis, so that a pivoting process of the carrier 26 can be performed. In this position the bearing 190 of the first steering arm 194 is located almost on a straight line through the two bearings 194 and 200. The piston 208 engages the steering arm 184 at a relatively small distance to the bearing 190, for example, one-third to one-quarter of the length of the steering arm 184.

This embodiment is enriched by the provision of a locking arrangement 204 with a hook 205, a clasp 207, a bearing 209, and a bearing 211 for the locking of the carrier 26 in its lower end position. The clasp 207 engages approximately at its center the stationary bearing 209, free to pivot vertically, and is connected on the one hand, particularly on the left in the drawing, free to pivot vertically in the bearing 211 with the lower end region of the actuating device 182, and on the other hand, provided with the hook 205. The hook 205 is configured and arranged in such a way that it can overlap and retain a stop 213 on the carrier 26. The locking arrangement 204 can be unlocked by extending the actuating device 182 or its piston 208, and initially forces the clasp 207 downward as seen in the drawing. Thereby, the hook 205 is lifted off the stop 213, and the carrier 26 can be pivoted upward. The locking arrangement 204 is closed by retracting the actuating device 182. Such a locking arrangement 204 can also be applied analogously to the other embodiments.

In order to raise the carrier 26, that is, in order to open the baling chamber 12, the actuating device 182 is extended. Thereby the hook 205 is raised initially and the carrier 26 is unlocked. Then, the piston 208 presses on the steering arm 184 in the direction 212 in order to move the carrier 26 out of a lower end position. In this case, the lever arm operates between the bearing 194 and the bearing 48. Due to this actuation, an angle θ between the two steering arms 184 and 186 enlarges and the carrier 26 of the outlet gate 56 is forced to pivot about its bearing 48 in direction 214. The carrier 26 reaches an intermediate position, as is shown in FIG. 12. In this position, and as seen in FIG. 12, both bearings 194 and 200 are located on the right side of the bearing 48 and the movement of the piston 208 already operates on the bearing 200. If the piston 208 is extended further, then the carrier 26 reaches its second end position, as is shown in FIG. 13. In this position, the bearing 194 is located directly above the bearing 48, while the bearing 200 is still located on the right side of the bearing 48. Therefore, during the pivoting process, two bearings 194 and 200 move along their own generally circular path about the bearing 48.

Figure 14:
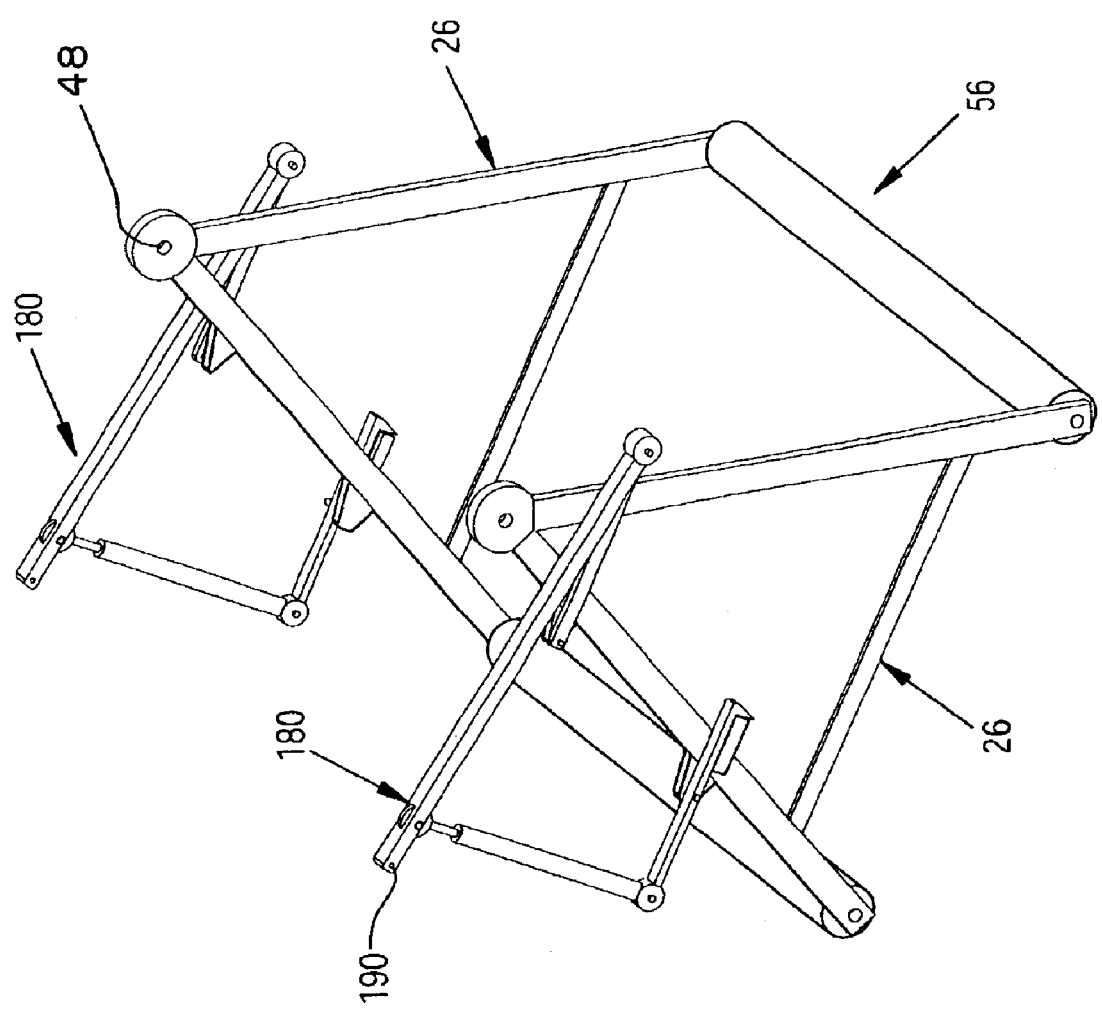
FIG. 14 is a perspective view of the actuating arrangement according to FIG. 11 with the two-piece linkage and the actuating devices for the outlet gate located in the first end position.

FIG. 14 shows the entire outlet or discharge gate 56, with in each case, one actuating device 180 on each carrier 26.

Having described the preferred embodiment, it will become apparent that various modifications can be made without departing from the scope of the invention as defined in the accompanying claims.

What is claimed is:

1. In a large round baler including a baling chamber defined in part by opposite side walls to which a bale discharge gate is mounted for pivoting vertically about a horizontal transverse axis, located approximately at the center of the baling chamber, between a lowered baling position and a raised bale discharge position, and an actuating arrangement being mounted for selectively moving said discharge gate between said bale-forming and bale discharge positions, the improvement comprising: said actuating arrangement being one of:

a) at least first and second extensible and retractable actuators coupled to said discharge gate at respective locations offset at different distances from said axis so that said at least first and second actuators may be operated in phased relationship to each other; and b) a combination of at least one extensible and retractable actuator, and a linkage coupled between said at least one actuator and said discharge gate, with said linkage including a pair of steering arms pivotally coupled to each other, with said at least one actuator being connected in such relationship to said pair of steering arms that operation of said at least one actuator will cause said discharge gate to be moved smoothly between said bale-forming and bale discharge positions.

2. The large round baler, as defined in claim 1, wherein said at least first and second extensible and retractable actuators, set forth in part a), are respective connected directly to said discharge gate.

3. The large round baler, as defined in claim 1, wherein said actuating arrangement includes said at least one actuator; and said at least one actuator being coupled to said discharge gate by said first and second steering arms pivotally connected to each other, with said first steering arm being mounted for pivoting about a second axis extending parallel to said first-named horizontal transverse axis, and with said second steering arm having an end pivotally coupled to said discharge gate: said at least one actuator being coupled directly to said first steering arem.

4. The large round baler, as defined in claim 1, wherein, said actuating arrangement is provided and includes at least first and second extensible and retractable actuators; said first actuator being coupled directly to said first steering arm; and said second extensible and retractable actuator being coupled between said first and second steering arms.

5. The large round baler, as defined in claim 2, wherein said at least first and second extensible and retractable actuators have respective lines of action that are inclined to each other for all positions of said discharge gate as the latter moves between said bale-forming and bale discharge positions.

6. The large round baler, as defined in claim 3, wherein, as considered when said discharge gate is in said bale-forming position, said first and second steering arms are connected to each other at a joint located on one side of said first-mentioned axis; said at least one extensible and retractable actuator being coupled between a second fixed axis and said first steering arm; and said second steering arm being coupled to said discharge gate at a location at an opposite side of said first-mentioned axis relative to said joint forming the connection between said first and second steering arms.

7. The large round baler, as defined in claim 3, wherein said actuating arrangement includes identical first and second steering arms provided on each of opposite sides of said baling chamber; and said first steering arms being joined at one end by a brace that extends parallel to said axis.

8. The large round baler, as defined in claim 4, wherein said second steering arm is provided with first and second legs extending at an angle to each other at said connection between said first and second steering arms; and said second actuator having one end coupled to an end of said first leg and an end of said second leg being coupled to said bale discharge gate.

9. The large round baler, as defined in claim 1, and further including a latch element mounted for pivoting vertically between a latched position engaging said bale discharge gate for holding the latter in said bale-forming position, and a released position, wherein it is disengaged from said bale discharge gate for permitting the latter to pivot to its bale discharge position; and said actuating arrangement being coupled to said latch element for moving the latter to said released position in response to said actuating arrangement being actuated to move said bale discharge gate from its bale-forming position to said bale discharge position.

10. The large round baler, as defined in claim 2, wherein said at least first and second extensible and retractable actuators are respectively coupled directly to said discharge gate at opposite sides of said baling chamber.

11. The large round baler, as defined in claim 1, wherein, with regard to the structure of said actuating arrangement being as set forth in part a), said at least first and second extensible and retractable actuators are double-acting hydraulic cylinders, and, with regard to the structure of said actuating arrangement set forth in part b), said at least one extensible and retractable actuator is a double-acting hydraulic cylinder.

* * * * *